United States Patent [19]

Moran

[11] 4,302,723
[45] Nov. 24, 1981

[54] APPARATUS AND METHOD FOR DETERMINING DIP AND/OR ANISOTROPY OF FORMATIONS SURROUNDING A BOREHOLE

[75] Inventor: James H. Moran, Spicewood, Tex.

[73] Assignee: Schlumberger Technology Corporation, New York, N.Y.

[21] Appl. No.: 48,877

[22] Filed: Jun. 15, 1979

[51] Int. Cl.³ .............................................. G01V 3/28
[52] U.S. Cl. ................................................ 324/343
[58] Field of Search ............................. 324/338–340, 324/342, 343, 346

[56] References Cited

U.S. PATENT DOCUMENTS

| | | | |
|---|---|---|---|
| 2,359,894 | 10/1944 | Brown et al. | 324/346 |
| 3,187,252 | 6/1965 | Hungerford | 324/343 |
| 3,510,757 | 5/1970 | Huston | 324/343 |
| 3,609,521 | 9/1971 | Desbrandes | 324/343 |
| 3,808,520 | 4/1974 | Runge | 324/343 |

FOREIGN PATENT DOCUMENTS

| | | | |
|---|---|---|---|
| 624715 | 8/1961 | Canada | 324/343 |
| 648928 | 8/1973 | U.S.S.R. | 324/343 |

*Primary Examiner*—Gerard R. Strecker
*Attorney, Agent, or Firm*—Kenneth Olsen; David Carroll; Martin Novack

[57] ABSTRACT

An induction well logging apparatus and method is disclosed for determining dip and/or anisotropy parameters of formations surrounding a borehole. A transmitter is provided and includes a first transmitter coil having an axis which is substantially parallel to the borehole axis and a second transmitter coil having an axis which is substantially perpendicular to the borehole axis. A receiver is provided and includes first and second receiver coils having axes which are substantially mutually orthogonal. Each of the receiver coils is substantially perpendicular to the borehole axis. The transmitter and receiver are mounted in a mechanically passive manner on a support member adapted for movement through the borehole. The transmitter coils are energized in a manner which permits the separate detection at the receivers of the currents induced in the formations by each of the two transmitter coils. The reactive components of the detected signals are used to obtain dip and/or anisotropy parameters of the formations. The formation dip angle and/or dip azimuth angle can be determined without dependence on anisotropy. Anisotropy can also be obtained using the described configuration. An advantage of the disclosed technique is that dip angle and dip azimuth angle can be obtained from voltages induced (via the formations) as between coils which are orthogonal to each other. Accordingly, most of the usual problems associated with direct coupling are avoided.

30 Claims, 4 Drawing Figures

APPARATUS AND METHOD FOR DETERMINING DIP AND/OR ANISOTROPY OF FORMATIONS SURROUNDING A BOREHOLE

BACKGROUND OF THE INVENTION

This invention relates to an apparatus and method for determining the presence of formations in the earth whose angles of dip are other than parallel or perpendicular to the axis of an earth borehole and, more particularly, to determining the dip angle and/or dip azimuth angle of such earth formations. The invention has particular utility in determining the presence and orientation of fractures, and is especially useful in open boreholes or in boreholes filled with a drilling fluid that is relatively nonconductive as compared to the formations being logged.

It is common practice to obtain measurements of the azimuthal direction and dip angle of formation bedding planes by passing through an earth borehole a so-called "dipmeter" tool having a plurality of circumferentially spaced pad mounted electrodes. Survey current is emitted from certain ones of the electrodes on each pad member to obtain a measure of the resistivity or conductivity of the adjoining earth formations to produce a plurality of resistivity logs. By properly correlating the fluctuations of these resistivity logs, the positioning of a bedding plane relative to the tool position can be readily calculated. Then, by measuring the bearing of the tool relative to some azimuthal reference, such as magnetic north, and the inclination of the tool relative to the true vertical or gravitational axis, the position of a bedding plane relative to the north and true vertical axes can be determined.

While conventional multiple pad dipmeter devices have provided generally satisfactory results, there are some difficulties inherent in these devices. For example, it is generally necessary to perform accurate correlations of a number of signals. Further, if the borehole is open-hole or filled with a relatively nonconductive drilling mud, such as an oil base drilling mud, the pad mounted electrodes need to make reasonably good contact with the formations surrounding the borehole in order to be assured of valid measurements.

Another type of dipmeter device that has been proposed is the so-called "induction dipmeter" which uses principles of induction logging to measure dip. Conventional induction logging employs coils wound on an insulating mandrel. One or more transmitter coils are energized by an alternating current. The oscillating magnetic field produced by this arrangement results in the induction of currents in the formations which are nearly proportional to its conductivity. These currents, in turn, contribute to the voltage induced in receiver coils. By selecting only that voltage component which is in-phase with the transmitter current, a signal is obtained that is approximately proportional to the formation conductivity. The transmitting coils of a conventional induction logging apparatus tend to induce secondary current loops in the formations which are concentric with the transmitting and receiving coils. However, certain conditions of the surrounding earth formations, such as dipping beds or factures, can cause the average plane of these secondary current loops to vary from a concentric alignment. Induction dipmeters attempt to use this phenomenon to advantage by measuring the voltages induced in coils having different orientations. In one type of prior art induction dipmeter scheme, a coil array is mechanically rotated at a constant frequency to produce modulation components in receiver coil signals at the frequency of rotation of the coil array. These modulation components are processed to obtain indications of the dip and/or dip azimuth of formation bedding planes. A disadvantage of this type of induction dipmeter is the requirement for bulky and power consuming equipment for rotating the coil array and for keeping track of the orientation of the coil array as it rotated. Accordingly, mechanically rotating induction dipmeters have not achieved significant commercial acceptance.

In addition to schemes which utilize mechanically rotating coils, prior art proposals have also been set forth for utilizing mechanically passive induction coils to obtain measurements of formation dip and/or anisotropy. For example, in the U.S. Pat. No. 3,510,757, vertical (i.e., aligned with the borehole axis) transmitter coils are used in conjunction with a pair of orthogonal, horizontal (i.e., perpendicular to the borehole axis) receiver coils. The outputs of the receiver coils are recorded and utilized to obtain indications of formation dip angle. In the U.S. Pat. No. 3,808,520, a vertical transmitter coil is used in conjunction with three receiver coils having mutually orthogonal axes; i.e., one vertical and two mutually orthogonal horizontal coils. The outputs of the three receiver coils are utilized in specified relationships to obtain combined dip and anisotropy information. It is noted in this patent that to obtain anisotropy information alone, it is necessary to have dip information from, for example, a conventional type of dipmeter logging device.

It is among the objects of the present invention to provide an induction logging technique which is an improvement over existing induction logging schemes for obtaining dip and/or anisotropy information, and which is particularly effective in situations where the formations being logged are much more highly conductive than the borehole medium in which a logging device is disposed.

SUMMARY OF THE INVENTION

The present invention is directed to a well logging apparatus and method for determining dip and/or anisotropy parameters of formations surrounding a borehole. In an embodiment of the apparatus of the invention, a transmitter is provided and includes a first transmitter coil having an axis which is substantially parallel to the borehole axis and a second transmitter coil having an axis which is substantially perpendicular to the borehole axis. A receiver is provided and includes first and second receiver coils having axes which are substantially mutually orthogonal. Each of these receiver coils is substantially perpendicular to the borehole axis. The transmitter and receiver are preferably mounted in a mechanically passive manner on a support member adapted for movement through the borehole. Means are provided for energizing the first and second transmitter coils. Preferably, the transmitter coils are energized in a manner which permits the separate detection of the currents induced in the formations by each of the two transmitter coils. For example, the transmitters may be alternately energized or energized at detectably different frequencies. Means are provided for detecting the signals induced in the receiver coils as a result of energizing the first transmitter coil. Means are also provided for detecting signals induced in at least one of the receiver coils as a result of energizing the second transmitter coil. Finally means are provided for combining the signals detected at the receivers to obtain dip and/or anisotropy parameters of the surrounding formations.

In a preferred embodiment of the invention, the first receiver coil is substantially parallel to the second transmitter coil, and the means for detecting signals induced in at least one of the receiver coils as a result of energizing the second transmitter coil comprises means for detecting signals induced in the second receiver coil. In this embodiment, the detecting means are adapted to detect the out-of-phase or reactive components of the signals induced in the receiver coils. Using the described technique, the formation dip angle and/or dip azimuth angle can be determined without dependence on anisotropy. However, if desired, anisotropy can also be obtained using the described configuration.

An advantage of a form of the present invention as described herein is that dip angle and dip azimuth angle can be obtained from voltages induced (via the formations) as between coils which are orthogonal to each other. Accordingly, most of the usual problems associated with direct coupling are avoided. Also, in the form of the invention hereof wherein only the reactive components of the received signals are employed, there is less difficulty with borehole effects than when resistive components are utilized. The relationships set forth for determining dip and/or anisotropy properties in the preferred configuration are obtained using a theoretical situation of zero transmitter-to-receiver spacing, but hold well for a short spacing situation. The reason that the transmitter and receiver can be considered as being at substantially the same position is that the reactive components of the detected signals are being utilized. So long as the transmitter-to-receiver spacing is small compared to skin depth, the reactive components of the detected signals are relatively insensitive to spacing. It will be understood, however, that the coil systems disclosed herein can be used to some advantage at whatever spacing is believed suitable for a particular application.

Further features and advantages of the invention will become more readily apparent from the following detailed description when taken in conjunction with the accompanying drawings.

DESCRIPTION OF THE PREFERRED EMBODIMENT

Figure 1:
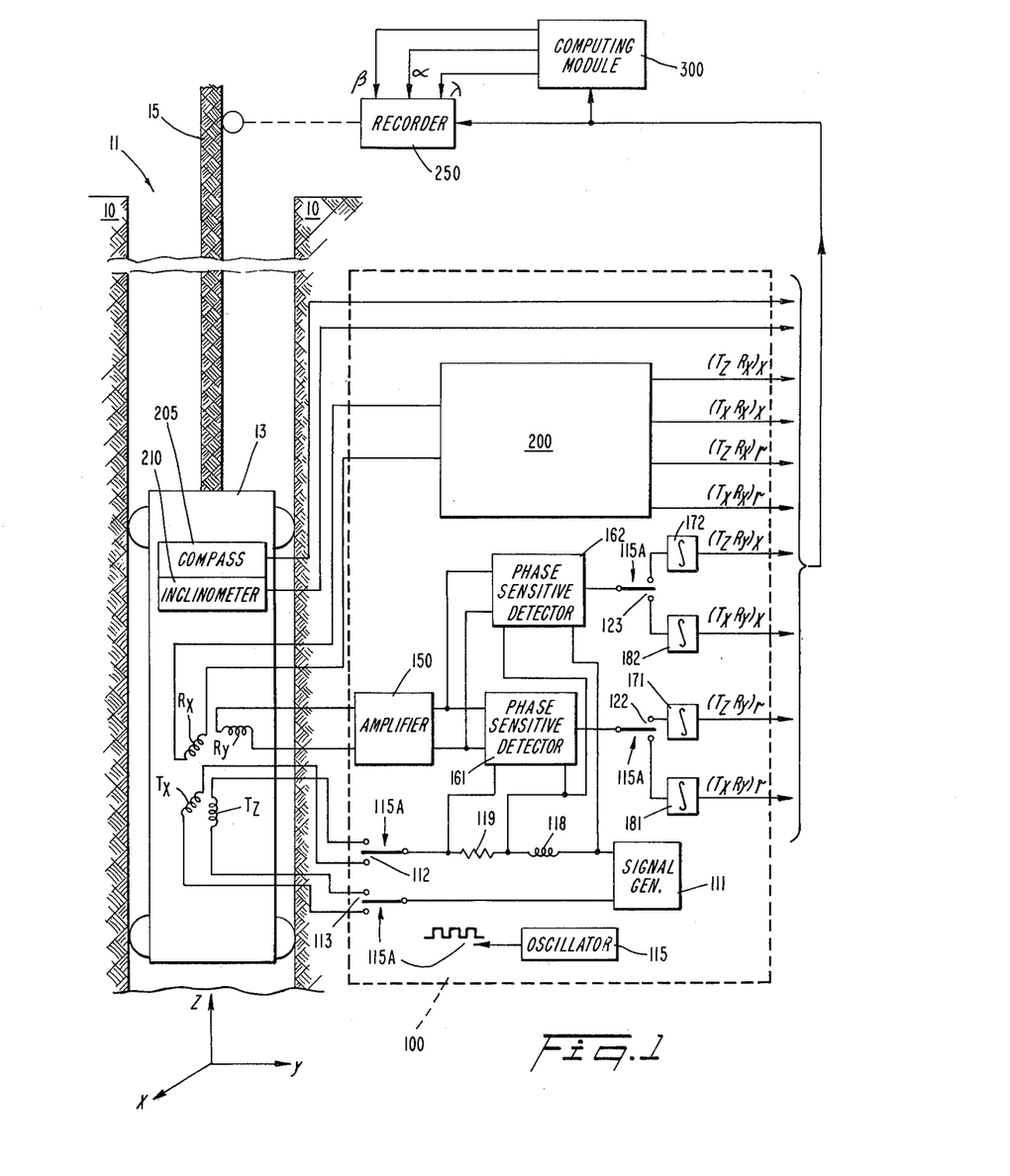
FIG. 1 illustrates an embodiment of the invention in a borehole, along with a schematic representation, partially in block form, of the coil system and associated circuitry.

Referring to FIG. 1, there is shown a representative embodiment of an induction logging apparatus in accordance with the present invention for investigating earth formations 10 traversed by a borehole 11. It is preferred that the invention be employed in situations where the borehole is either filled with a drilling fluid that is relatively nonconductive as compared to the formations being logged, or is empty hole. The downhole device of the logging apparatus includes coils mounted on a centralized support member 13 adapted for movement through the borehole 11. The downhole device also includes a fluid-tight enclosure which contains electronic circuitry, this circuitry being shown in block diagram form in dashed enclosure 100 at the side of the borehole. The downhole device is suspended from the surface of the earth by an armored multiconductor cable 15. A suitable drum and winch mechanism (not shown) is located at the surface of the earth for raising and lowering the device through the borehole. Also located at the surface of the earth may be a power supply (not shown) for supplying electrical energy by way of the cable 15 to the downhole equipment.

The downhole device includes a pair of transmitter coils designated $T_z$ and $T_x$, and a pair of receiver coils designated $R_x$ and $R_y$. The transmitter coil $T_z$ has its axis aligned with the borehole axis; i.e., the z direction in FIG. 1. The transmitter coil $T_x$ and the receiver coil $R_x$ have their axes aligned perpendicular to the borehole axis; i.e., in the x direction in FIG. 1. The receiver coil $R_y$ has its axis aligned perpendicular to the borehole axis and also perpendicular to the x direction; i.e., in the y direction in FIG. 1. The transmitter coils preferably have intersecting axes, as shown, and may be concentric. The same is true of the receiver coils. The transmitter-to-receiver spacing is preferably, although not necessarily, quite short, for example, of the order of one foot or less. In fact, the transmitter and receiver may, if desired, be at substantially the same location. In the present embodiment the transmitter coils $T_z$ and $T_x$ are alternately energized by a generator 111. Voltage controlled switches 112 and 113, which are controlled by the square wave output 115A of an oscillator 115, alternately couple energy from generator 111 to the coils $T_z$ and $T_x$, depending on the polarity of the square wave.

The receiver coil $R_y$ is coupled to an amplifier 150 whose output is, in turn, coupled to phase sensitive detectors 161 and 162. The phase sensitive detector 161 receives a reference phase signal from across a resistor 119 which is phase with the current in the transmitter coil. The phase sensitive detector 162 receives as a reference phase signal the signal developed across an inductor 118, this signal being in phase quadrature with the current in the transmitter coil. Using these phase reference signals, the phase sensitive detectors 161 and 162 respectively generate output signals which are proportional to the in-phase or "resistive" component of the induced receiver signal and the phase quadrature or "reactive" component of the induced receiver signal. The outputs of phase sensitive detectors 161 and 162 are respectively coupled to voltage controlled switches 122 and 123. These switches are under control of square wave 115A, and are therefore under common control with the switches 112 and 113. One branch of switch 123 is coupled to integrator 172 and the other branch thereof is coupled to integrator 182. Also, one branch of switch 122 is coupled to integrator 171 and the other branch thereof is coupled to integrator 181. The integrators serve as averaging circuits which provide a smooth output notwithstanding the 50% duty cycle of their inputs. The The outputs of integrators 171 and 181 are respectively designated $(T_zR_y)_r$ and $(T_xR_y)_r$. The outputs of integrators 172 and 182 are respectively designated $(T_zR_y)_x$ and $(T_xR_y)_x$. In accordance with the indicated notation, the T and R within the parentheses indicates that the integrator output is the result of coupling between the specified transmitter and receiver coil. The subscript outside the parentheses indicates either the resistive ("r") or the reactive ("x") component of the signal induced at the specified receiver coil. Thus, for example, the output of integrator 171 is $(T_zR_y)_r$; i.e., the resistive component of the voltage induced in receiver coil $R_y$ when the transmitter coil $T_z$ has been energized. As another example, the output of integrator 182 is $(T_xR_y)_x$, i.e., the reactive component of the voltage induced in receiver coil $R_y$ when the transmitter coil $T_x$ has been energized. In operation, it can be readily seen that the switches 122 and 123 operate in synchronism with the switches 112 and 113. Accordingly, when the switching control signal 115A is one polarity (for example, positive) transmitter coil $T_z$ is energized and the outputs of phase sensitive detectors 161 and 162 are respectively coupled to integrators 171 and 172. This results in the integrators 171 and 172 generating outputs which respectively represent the resistive and reactive components of the voltage induced across receiver coil $R_y$ when transmitter coil $T_z$ is energized. Similarly, when the square wave 115A is at its other polarity (for example, negative), transmitter coil $T_x$ is energized and the outputs of phase sensitive detectors 161 and 162 are respectively coupled to integrators 181 and 182. This results in integrators 181 and 182 generating outputs which respectively represent the resistive and reactive components of the voltage across receiver coil $R_y$ when transmitter coil $T_x$ is energized.

The circuitry just described as being coupled to receiver $R_y$ is duplicated with respect to the receiver $R_x$ and is used to generate outputs designated $(T_zR_x)_x$, $(T_xR_x)_x$, $(T_zR_x)_r$ and $(T_xR_x)_r$. For clarity of illustration, this duplicative circuitry is not shown in detail in FIG. 1, but is represented by the block 200. The eight outputs representative of transmitter/receiver coupling components are transmitted to the surface of the earth via armored multiconductor cable 15. As is known in the dipmeter art, a compass 205 and an inclinometer 210 may be conventionally provided for determining the relative azimuth of the device and its orientation with respect to the gravitational axis. The outputs of these units will also be transmitted to the earth's surface via cable 15. At the earth's surface, the signals transmitted from downhole are recorded by recorder 250 as a function of borehole depth. The recorder is conventionally provided with means (not shown) synchronized with the length of cable 15 and, accordingly, with the depth of the downhole logging device. The downhole signals are also coupled to a computing module 300 which generates outputs that are also recordable on recorder 250.

Figure 2:
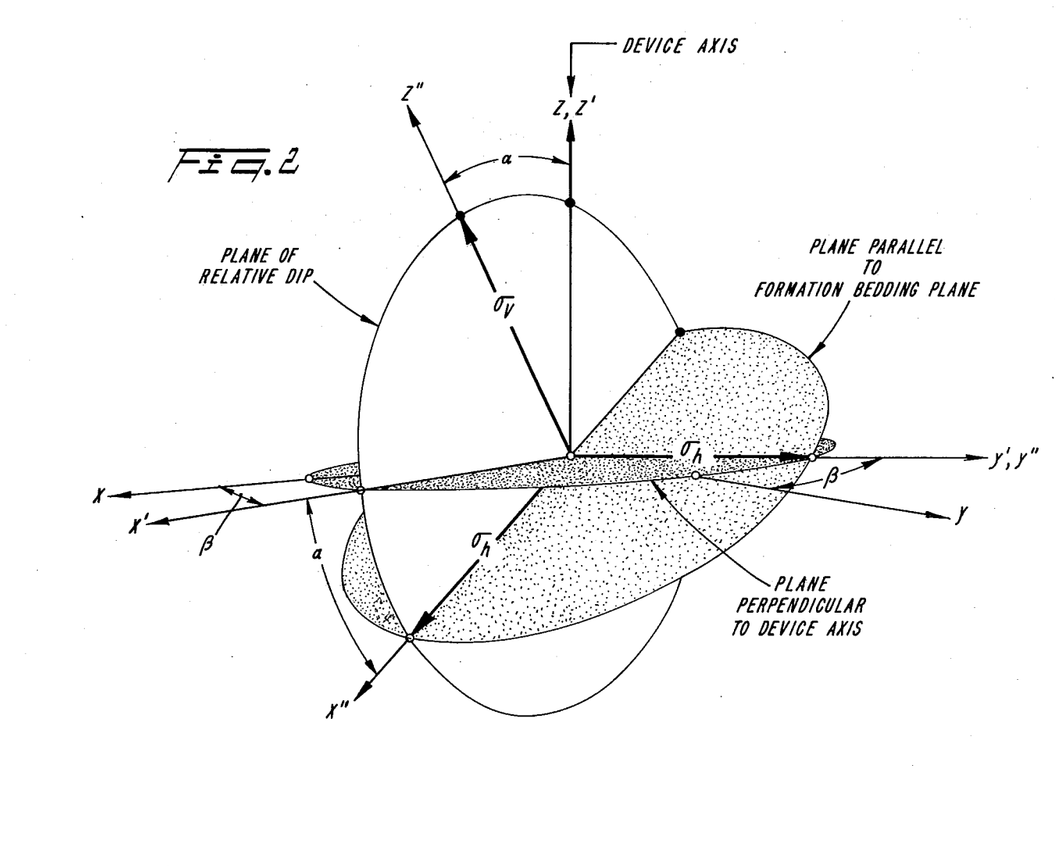
FIG. 2 illustrates the relationship of a dipping anisotropic formation bedding plane to a plane perpendicular to the axis of the logging device.

Before considering the manner in which the outputs of the downhole circuitry are processed by computing module 300 to obtain dip and/or anisotropy parameters, reference will be made to FIG. 2 to establish the geometrical relationships between the logging device and a dipping plane whose parameters are to be determined. In FIG. 2 the xyz coordinate system corresponds to that utilized in conjunction with FIG. 1; i.e., the z axis is considered to be the borehole axis with which the transmitter coil $T_z$ of the logging device is substantially aligned. The xy plane is therefore the plane perpendicular to the logging device. In FIG. 2, the bedding plane is defined by a plane perpendicular to the z" axis; i.e., the x", y" plane. Also, the plane perpendicular to the y" axis in the bedding plane is called the "plane of relative dip," and can be seen to be the x" z" plane. To visualize the relationship between the formation bedding plane and the plane perpendicular to the device axis, and to further define terms, consider the following transformation, beginning with the xy plane which is perpendicular to the device axis (z): first, the xy plane is rotated around the z axis through an angle $\beta$. This results, as shown in FIG. 2, in a coordinate system x'y'z', where z' is coincident with z since this first rotation is about the z axis. Next, y' is used as the axis of rotation, and the z'x' plane is rotated through an angle $\alpha$. This results in the x"y"z" coordinate system (where y" coincides with y' since the second rotation is about the y' axis) which is used to define the formation bedding plane (x"y") and the plane of relative dip (x"x"). The angle $\alpha$ is commonly known as the dip angle, and the angle $\beta$ is commonly known as the dip azimuth angle. The conductivity in the formation bedding plane is designated $\sigma_h$ and the conductivity in the direction perpendicular to the formation bedding plane is designated $\sigma_v$. Anisotropy, designated $\lambda$, is defined by:

$$\lambda = \sqrt{\frac{\sigma_h}{\sigma_v}} \quad (1)$$

Using as a model magnetic dipoles in place of the coils, and assuming an anisotropic homogeneous formation having the dip and anisotropy parameters indicated in FIG. 2, applicant has derived, from Maxwell's equations, the following proportionality relationships which represent coupling of the reactive signal components in FIG. 1:

$$(T_zR_x)_x \sim \sigma_h^{\frac{3}{2}} \left(1 - \frac{1}{\lambda^2}\right) \sin\alpha \cos\alpha \cos\beta \quad (2)$$

$$(T_zR_y)_x \sim \sigma_h^{\frac{3}{2}} \left(1 - \frac{1}{\lambda^2}\right) \sin\alpha \cos\alpha \sin\beta \quad (3)$$

$$(T_xR_y)_x \sim \sigma_h^{\frac{3}{2}} \left(1 - \frac{1}{\lambda^2}\right) \sin^2\alpha \sin2\beta \quad (4)$$

$$(T_xR_x)_x \sim \sigma_h^{\frac{3}{2}} \left[\left(\sin^2\alpha + \frac{3+\lambda^2}{4\lambda^2} \cos^2\alpha\right) \cos^2\beta + \frac{3+\lambda^2}{4\lambda^2} \sin^2\beta\right] \quad (5)$$

By manipulating relationships (2), (3) and (4), we obtain:

$$\tan\beta = \frac{(T_zR_y)_x}{(T_zR_x)_x}$$

$$\tan\alpha = \sqrt{\frac{(T_xR_y)_x^2}{4(T_zR_y)_x(T_zR_x)_x \cos\beta \sin\beta}}$$

Using relationship (6), the dip azimuth angle, $\beta$, can be obtained from $(T_zR_y)_x$ and $(T_zR_x)_x$. Then, relationship (7) can be utilized to obtain the dip angle, $\alpha$. Relationships (4) and (5) can then be solved simultaneously to obtain the unknowns $\sigma_h$ and $\sigma_v$, thereby giving $\lambda$ (bearing in mind that $\lambda$ is a function of $\sigma_h$ and $\sigma_v$, as set forth in equation (1)). This may be done graphically or automatically, for example, using computer table look-up, curve matching or iterative solution.

Figure 3:
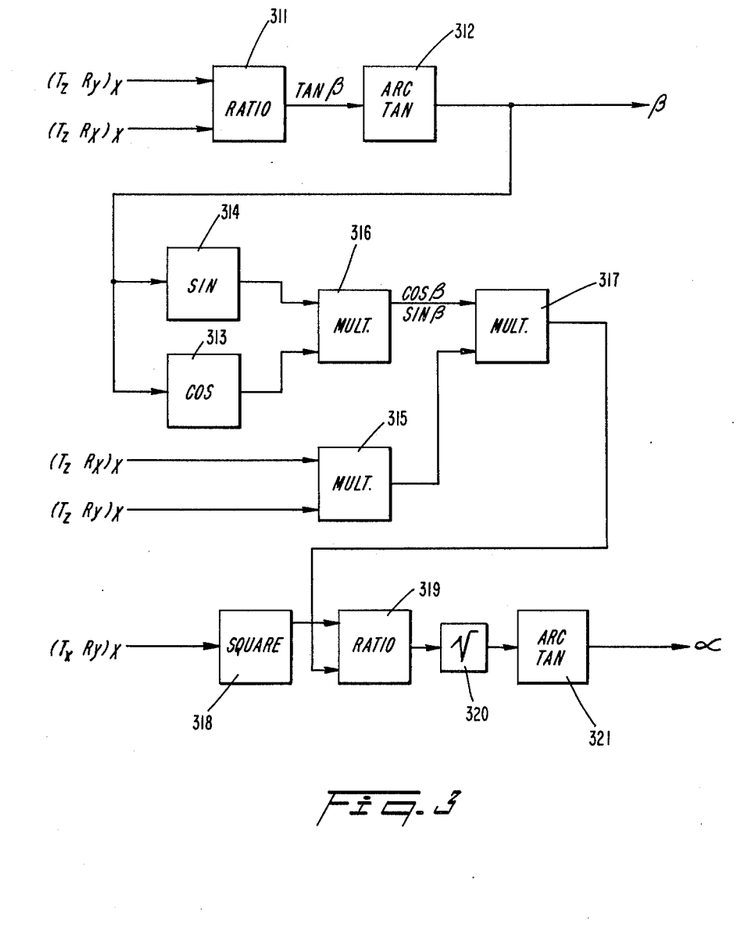
FIG. 3 is a block diagram of portions of the computing module of FIG. 1.

Referring to FIG. 3, there is shown a block diagram of an embodiment of a portion of computing module which can be utilized to obtain the dip azimuth angle, $\beta$, and/or the dip angle $\alpha$, in accordance with the relationships (6) and (7). It will be understood, however, that this embodiment is merely exemplary and that alternate signal processing or computing techniques could be utilized to process the downhole signals of this invention (i.e., the reactive and/or resistive coupling components) to obtain dip and/or anisotropy parameters of the surrounding formations from relationships (2) through (5), or their equivalents. In this same context, those skilled in the art will recognize that relationships can be set forth which also utilize the resistive components of the coupling signals in obtaining or confirming dip and/or anisotropy parameters. However, for the reasons set forth herein, it is considered the preferred mode of the invention to utilize the reactive components to obtain the desired dip and/or anisotropy parameters. Also, it should be clear that the signals from the compass and inclinometer can be used to implement corrections in the usual manner. In FIG. 3, the signals representative of $(T_zR_y)_x$ and $(T_zR_x)_x$ are coupled to a ratio circuit 311 whose output is proportional to tan $\beta$ in accordance with relationship (2). This signal is coupled to a circuit 312 having an arc tan characteristic, so the output of circuit 312 is proportional to $\beta$.

The signal proportional to $\beta$ is recorded on recorder 250 (FIG. 1) and is also coupled to circuits 313 and 314 which respectively have cos and sin characteristics. The outputs of these circuits are coupled to a multiplier 316 which produces an output proportional to cos $\beta$ sin $\beta$. This output is one input to a further multiplier circuit 317. The other input to multiplier 317 is the output of still another circuit 315 which receives as its input the signals $(T_zR_y)_x$ and $(T_zR_y)_x$. The output of multiplier 317 is coupled to the divisor branch of a ratio circuit 319. The dividend branch of ratio circuit 319 receives the output of a squaring circuit 318 whose input is signal $(T_xR_y)_x$. The output of ratio circuit is coupled to a circuit 320 having a square root characteristic, and the output of circuit 320 is in turn coupled to arc tan circuit 321. The output of circuit 321 is a signal proportional to the dip angle, $\alpha$, in accordance with relationship (7).

Figure 4:
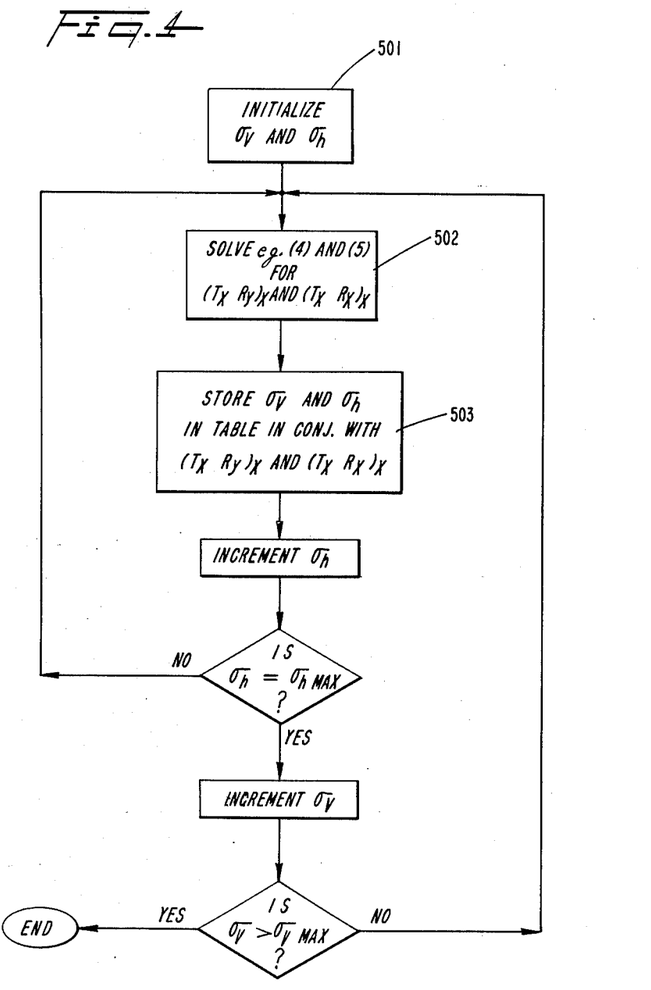
FIG. 4 is a flow diagram useful in implementing a table look-up scheme which can be utilized in connection with the invention.

The computing module may include, for example, any suitable small general purpose digital computer. A simplified flow chart for programming the computing module 300 to implement a table look-up scheme for determination of $\sigma_h$ and $\sigma_v$ is shown in FIG. 4. Initial values of $\sigma_v$ and $\sigma_h$ are first selected, as indicated by the block 501. These values could typically be the lowest possible expected values of $\sigma_v$ and $\sigma_h$. Block 502 is then entered and represents the function of solving for $(T_xR_y)_x$ and $(T_xR_x)_x$ using relationships (4) and (5). The current values of $\sigma_v$ and $\sigma_h$ are then stored in conjunction with the calculated values of $(T_xR_y)_x$ and $(T_xR_x)_x$, as represented by the block 503. The value of $\sigma_h$ is then incremented, as represented by the block 504. $\sigma_h$ is then tested (diamond 505) to determine if it exceeds the maximum value of $\sigma_h$ to be used, designated $\sigma_{hmax}$. If not, block 502 is reentered, and new values are stored in the table. When $\sigma_h$ has been incremented over its full range, the answer to the inquiry of diamond 505 will be "yes" and block 506 is entered, this block representing the incrementing of $\sigma_v$. $\sigma_v$ is then tested (diamond 507) to determine if it exceeds the maximum value of $\sigma_v$ to be utilized, designated $\sigma_{vmax}$. If not, block 502 is again entered and, as previously described, a new set of values will be determined as $\sigma_h$ is iterated over its full range for this new value of $\sigma_v$. This procedure will continue until $\sigma_v$ exceeds its maximum value, $\sigma_{vMAX}$ whereupon the routine is over and the full table of values has been stored. Later, during operation, values of $(T_xR_y)_x$ and $(T_xR_x)_x$ derived from measurements are entered into computing module 300 which finds the closest match $\sigma_v$, $\sigma_h$ from the stored table. These values may then be recorded on recorder 250, either separately or in the form of $\lambda$, in accordance with relationship (1).

The invention has been described with reference to a particular embodiment, but variations within the spirit and scope of the invention will occur to those skilled in the art. For example, it will be recognized that equations (2) through (5) represent four equations in four unknowns, and solution can be implemented in any manner that is desired as alternative to those indicated in this specification. Further, it will be understood that electrical and/or numerical means can be utilized to eliminate direct mutual coupling if and where necessary. Also, for simplicity of explanation, individual coils have been illustrated, but focusing coils can be employed, as is known in the art. Finally, while processing of the derived downhole signals is shown as being implemented at the well bore site, processing of these signals may alternatively be performed at a remote location.

I claim:

1. Well logging apparatus for determining dip and/or anisotropy parameters of formations surrounding a borehole, comprising:

a support member adapted for movement through the borehole;

a transmitter including a first transmitter coil having an axis which is substantially parallel to the borehole axis and a second transmitter coil having an axis which is substantially perpendicular to the borehole axis;

a receiver including first and second receiver coils having substantially mutually orthogonal axes which are both substantially perpendicular to the borehole axis;

said transmitter and receiver being mounted in a mechanically passive manner on said support member;

means for energizing the first transmitter coil;

means for detecting signals induced in each of said receiver coils as a result of energizing said first transmitter coil;

means for energizing the second transmitter coil;

means for detecting signals induced in at least one of said receiver coils as a result of energizing said second transmitter coil; and means for combining the detected signals to obtain indications of the formation dip and/or anisotropy parameters.

2. Apparatus as defined by claim 1 wherein said first receiver coil is substantially parallel to said second transmitter coil, and wherein said means for detecting signals induced in at least one of said receiver coils as a result of energizing said second transmitter coil comprises means for detecting signals induced in said second receiver coil.

3. Apparatus as defined by claim 1 wherein each of said means for detecting signals includes means for detecting the reactive components of said signals.

4. Apparatus as defined by claim 2 wherein each of said means for detecting signals includes means for detecting the reactive components of said signals.

5. Apparatus as defined by claim 1 wherein said means for energizing said first transmitter coil and said means for energizing said second transmitter coil are adapted to operate in alternating fashion.

6. Apparatus as defined by claim 2 wherein said means for energizing said first transmitter coil and said means for energizing said second transmitter coil are adapted to operate in alternating fashion.

7. Apparatus as defined by claim 4 wherein said means for energizing said first transmitter coil and said means for energizing said second transmitter coil are adapted to operate in alternating fashion.

8. Well logging apparatus for determining dip angle and/or dip azimuth angle of formations surrounding a borehole, comprising:
   a support member adapted for movement through the borehole;
   a transmitter mounted on said support member and including a first transmitter coil having an axis which is substantially parallel to the borehole axis and a second transmitter coil having an axis which is substantially perpendicular to the borehole axis;
   a receiver mounted on said support member and including first and second receiver coils having substantially mutually orthogonal axes which are both substantially perpendicular to the borehole axis;
   means for energizing the first transmitter coil;
   means for detecting the reactive component of signals induced in each of said receiver coils as a result of energizing said first transmitter coil;
   means for energizing said second transmitter coil;
   means for detecting the reactive component of signals induced in at least one of said receiver coils as a result of energizing said second transmitter coil; and
   means for combining the detected signals to obtain indications of the formation dip angle and/or dip azimuth angle.

9. Apparatus as defined by claim 8 wherein said first receiver coil is substantially parallel to said second transmitter coil, and wherein said means for detecting the reactive component of signals induced in at least one of said receiver coils as a result of energizing said second transmitter coil comprises means for detecting the reactive component of signals induced in said second receiver coil.

10. Apparatus as defined by claim 8 wherein said means for energizing said first transmitter coil and said means for energizing said second transmitter coil are adapted to operate in alternating fashion.

11. Apparatus as defined by claim 9 wherein said means for energizing said first transmitter coil and said means for energizing said second transmitter coil are adapted to operate in alternating fashion.

12. A well logging method for determining dip and/or anisotropy parameters of formations surrounding a borehole, comprising the steps of:
   suspending in a borehole on a mechanically passive support member a transmitter and receiver, the transmitter including a first transmitter coil having an axis which is substantially parallel to the borehole axis and a second transmitter coil having an axis which is substantially perpendicular to the borehole axis, and the receiver including first and second receiver coils having substantially mutually orthogonal axes which are both substantially perpendicular to the borehole axis;
   energizing the first transmitter coil;
   detecting signals induced in each of said receiver coils as a result of energizing said first transmitter coil;
   energizing the second transmitter coil;
   detecting signals induced in at least one of said receiver coils as a result of energizing said second transmitter coil; and
   combining the detected signals to obtain indications of the formation dip and/or anisotropy parameters.

13. The method as defined by claim 12 wherein said first receiver coil is substantially parallel to said second transmitter coil, and wherein said step of detecting signals induced in at least one of said receiver coils as a result of energizing said second transmitter coil comprises detecting signals induced in said second receiver coil.

14. The method as defined by claim 12 wherein each of said steps of detecting signals includes detecting the reactive components of said signals.

15. The method as defined by claim 13 wherein each of said steps of detecting signals includes detecting the reactive components of said signals.

16. The method as defined by claim 12 wherein said step of energizing said first transmitter coil and said step of energizing said second transmitter coil are performed in alternating fashion.

17. The method as defined by claim 13 wherein said step of energizing said first transmitter coil and said step of energizing said second transmitter coil are performed in alternating fashion.

18. The method as defined by claim 15 wherein said step of energizing said first transmitter coil and said step of energizing said second transmitter coil are performed in alternating fashion.

19. A well logging method for determining dip angle and/or dip azimuth angle of formations surrounding a borehole, comprising the steps of:
   suspending in a borehole on a support member a transmitter and receiver, the transmitter including a first transmitter coil having an axis which is substantially parallel to the borehole axis and a second transmitter coil having an axis which is substantially perpendicular to the borehole axis, and the receiver including first and second receiver coils having substantially mutually orthogonal axes which are both substantially perpendicular to the borehole axis:
   energizing the first transmitter coil;
   detecting the reactive component of signals induced in each of said receiver coils as a result of energizing said first transmitter coil;
   energizing the second transmitter coil;
   detecting the reactive component of signals induced in at least one of said receiver coils as a result of energizing said second transmitter coil; and
   combining the detected signals to obtain indications of the formation dip angle and/or azimuth angle.

20. The method as defined by claim 19 wherein said first receiver coil is substantially parallel to said second transmitter coil, and wherein said step of detecting the reactive component of signals induced in at least one of said receiver coils as a result of energizing said second transmitter coil comprises detecting the reactive component of signals induced in said second receiver coil.

21. The method as defined by claim 19 wherein said step of energizing said first transmitter coil and said step of energizing said second transmitter coil are performed in alternating fashion.

22. The method as defined by claim 20 wherein said step of energizing said first transmitter coil and said step of energizing said second transmitter coil are performed in alternating fashion.

23. Well logging apparatus for determining the anisotropy of formations surrounding a borehole, comprising:
a support member adapted for movement through the borehole;
a transmitter mounted on said support member and including a first transmitter coil having an axis which is substantially parallel to the borehole axis and a second transmitter coil having an axis which is substantially perpendicular to the borehole axis;
a receiver mounted on said support member and including first and second receiver coils having substantially mutually orthogonal axes which are both substantially perpendicular to the borehole axis;
means for energizing the first transmitter coil;
means for detecting the reactive component of signals induced in each of said receiver coils as a result of energizing said first transmitter coil;
means for energizing said second transmitter coil;
means for detecting the reactive component of signals induced in at least one of said receiver coils as a result of energizing said second transmitter coil; and
means for combining the detected signals to obtain indications of the formation anisotropy.

24. Apparatus as defined by claim 23 wherein said first receiver coil is substantially parallel to said second transmitter coil, and wherein said means for detecting the reactive component of signals induced in at least one of said receiver coils as a result of energizing said second transmitter coil comprises means for detecting the reactive component of signals induced in said second receiver coil.

25. Apparatus as defined by claim 23 wherein said means for energizing said first transmitter coil and said means for energizing said second transmitter coil are adapted to operate in alternating fashion.

26. Apparatus as defined by claim 24 wherein said means for energizing said first transmitter coil and said means for energizing said second transmitter coil are adapted to operate in alternating fashion.

27. A well logging method for determining the anisotropy of formations surrounding a borehole, comprising the steps of:
suspending in a borehole on a support member a transmitter and receiver, the transmitter including a first transmitter coil having an axis which is substantially parallel to the borehole axis and a second transmitter coil having an axis which is substantially perpendicular to the borehole axis, and the receiver including first and second receiver coils having substantially mutually orthogonal axes which are both substantially perpendicular to the borehole axis;
energizing the first transmitter coil;
detecting the reactive component of signals induced in each of said receiver coils as a result of energizing said first transmitter coil;
energizing the second transmitter coil;
detecting the reactive component of signals induced in at least one of said receiver coils as a result of energizing said second transmitter coil; and
combining the detected signals to obtain indications of the formation anisotropy.

28. The method as defined by claim 27 wherein said first receiver coil is substantially parallel to said second transmitter coil, and wherein said step of detecting the reactive component of signals induced in at least one of said receiver coils as a result of energizing said second transmitter coil comprises detecting the reactive component of signals induced in said second receiver coil.

29. The method as defined by claim 27 wherein said step of energizing said first transmitter coil and said step of energizing said second transmitter coil are performed in alternating fashion.

30. The method as defined by claim 28 wherein said step of energizing said first transmitter coil and said step of energizing said second transmitter coil are performed in alternating fashion.

* * * * *